United States Patent
Carpenter et al.

(10) Patent No.: US 6,347,020 B1
(45) Date of Patent: Feb. 12, 2002

(54) DOUBLE-DOOR SAFETY ACCESS PORT FOR AUTOMATED TAPE LIBRARY

(75) Inventors: Kipley T. Carpenter, Thornton; Mike A. Aschenbrenner, Westminster, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/435,405

(22) Filed: Nov. 5, 1999

(51) Int. Cl.[7] ............................ G11B 15/68; G11B 17/02
(52) U.S. Cl. ....................................... 360/92; 360/98.04
(58) Field of Search ..................... 360/92, 98.04–98.06; 221/83; 414/932

(56) References Cited

U.S. PATENT DOCUMENTS

| | | |
|---|---|---|
| 3,504,808 A | 4/1970 | Carabateas |
| 4,287,541 A | 9/1981 | Tanahashi et al. |
| 4,458,802 A | 7/1984 | Maciver et al. |
| 4,779,151 A | 10/1988 | Lind et al. |
| 4,879,615 A | 11/1989 | Teranishi et al. |
| 4,945,429 A | 7/1990 | Munro et al. |
| 5,278,708 A * | 1/1994 | Apple et al. ................... 360/92 |
| 5,429,470 A | 7/1995 | Nicol et al. |
| 5,449,229 A * | 9/1995 | Aschenbrenner et al. ..... 360/92 |
| 5,454,485 A | 10/1995 | Dalziel |
| 5,940,243 A | 8/1999 | Kanetsuku et al. |
| 6,088,189 A * | 7/2000 | Utsumi et al. ................ 360/92 |

FOREIGN PATENT DOCUMENTS

| | | |
|---|---|---|
| DE | 3918198 C1 | 2/1990 |
| EP | 0 288 165 A2 | 10/1988 |
| JP | 61-150908 | 7/1986 |

OTHER PUBLICATIONS

IBM Technical Disclosure Bulletin; vol. 16, No. 10, Mar. 1994; entitled "Tape Library Apparatus"; by R. L. Schaaf; pp 3145–3146.

* cited by examiner

Primary Examiner—Robert S. Tupper
(74) Attorney, Agent, or Firm—Brooks & Kushman P.C.

(57) ABSTRACT

A double-door safety access port for use with an automated tape library cartridge machine utilizes two doors that operate independently, but are interconnected mechanically with a latch mechanism and a self-locking gear drive arrangement to control loading and unloading of tape cartridges into the library machine. An inner door of the access port is motor-driven between two positions, an open position allowing robot access to the cartridges, and a closed position that unlatches an outer door to allow operator access to the tape cartridges. The closed position closes off the inside of the library machine to prevent any possibility of operator contact with the library robot. The self-locking gear drive arrangement allows the inner door to be moveable only by operation of a motor. This prevents any manual rotation of the inner door by an operator. Until the outer door is latched, the inner door can not be driven back to its open position.

8 Claims, 7 Drawing Sheets

DOUBLE-DOOR SAFETY ACCESS PORT FOR AUTOMATED TAPE LIBRARY

TECHNICAL FIELD

The present invention relates to automated tape library machines used for mass storage of data, and more particularly to an improved access port which allows removal of a tape cartridge while minimizing the risk of operator injury.

BACKGROUND ART

Automated tape library machines have been used to greatly increase the efficiency and ease at which large quantities of data, such as generated by a computer network, can be stored and accessed by external host systems. Such machines are well known in the art, and generally include a robotic unit that moves within a housing under control of a microprocessor to retrieve and load desired tape cartridges into a tape drive unit. These machines further include an access port, or customer access port (CAP), arranged to allow a user to insert and remove data storage cartridges into the automated tape library machine without taking the entire machine off-line.

The mechanical design of a CAP for any given tape library machine must satisfy a wide variety of design factors relating to particular functional, safety, aesthetic, economic, and reliability requirements. Of these design factors, safety is perhaps the most important. In other words, a CAP must be arranged so that an operator is never in danger of contacting any moving robotic mechanisms within the library. Known CAP arrangements typically provide an input slot for receiving a cartridge from the customer, and a mechanism that subsequently moves the inserted cartridge from the input slot into engagement with the robotic tape system. Other arrangements use a tape loading and unloading mechanism that rotates one or more inserted tape cartridges from a position in which the tapes face outwardly through an opening in the library housing, to a position in which the tapes face inwardly so as to be accessible by a transport/robotic mechanism. An example of such a rotary arrangement is provided in U.S. Pat. No. 4,779,151 to Lind et al.

However, known CAP arrangements that use mechanisms to transport a tape from a user accessible position to a robot accessible position typically suffer the drawback of requiring expensive and complicated mechanical arrangements in order to meet high speed tape loading/de-loading and reliability demands. Therefore, a need exists for a simple access port arrangement which is both reliable and does not compromise customer/user safety.

DISCLOSURE OF INVENTION

It is therefore an object of the present invention to provide an automatic access port for a tape library machine that prevents any potential contact between an operator and a robotic mechanism located inside the machine during loading and unloading of tape cartridges.

It is another object of the present invention to provide an automatic access port for a tape library machine which utilizes two separate but interlocking doors which latch and unlatch in a controlled manner about a stationary tape cartridge retainer mechanism so as to prevent any potential contact between the operator and a robot mechanism within the library.

In accordance with these and other objects, the present invention provides an access port mounted to an automated tape cartridge library housing for allowing insertion and removal of tape cartridges from the library that includes a cartridge access opening formed in the library housing, an outer door externally mounted to the housing so as cover the cartridge access opening in a closed position, and a rotatable inner door mounted to the inside of the housing in alignment with the cartridge access opening. A latch arrangement is mounted to the inner and outer doors which only unlatches the outer door when the inner door is in a closed position.

In accordance with one embodiment of the present invention, the inner rotatable door includes a stationary frame which defines a cavity within the access opening and is arranged to support placement of a stationary cartridge retainer mechanism therein. The inner door can include a drive arrangement which prevents manual opening of the inner door.

Thus, in accordance with one aspect of the present invention, a double-door safety access port is provided as a simple and safe mechanism for allowing an operator to insert and remove cartridges from a library machine without requiring the machine to be taken off-line. The two doors operate independently, but are interconnected mechanically with a latch mechanism and electrically through at least one electrical switch, to allow a library machine to control customer access to the access port. In addition, because the retainer mechanism is allowed to be stationary, the cartridges are inserted and removed with their labels facing the robot side of the access port and remain fixed in respective cell or slot positions during operation of the access port doors. The inner door of the access port is motor-driven between an open position allowing robot access to the cartridges, and a closed position to provide a physical barrier between the inside of the labeling machine and an operator. The outer door allows operator access to the tape cartridges when in an open position, but can not be unlatched and opened if the inner door is not fully closed. An inner door driving mechanism preferably includes a self-locking worm gear to render the inner door moveable only by operation of the motor. This prevents any manual rotation of the inner door by an operator. The inter-latching mechanism between the inner and an outer door is responsive to the inner door being in the closed position to unlatch or release the outer door. Once the outer door is unlatched, an operator can access cartridges loaded in the access port. The outer door is closed manually by the operator to a latched position, and once latched, the inner door can be driven back to its open position by operation of the motor. The inter-latching of the inner door and outer door insures that the inside of the library machine is always closed off to access by an operator to prevent any possibility of operator contact with the library robot.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIGS. 7(a)–(d) are perspective views of the inner door illustrating operation of inter-latching mechanism in accordance with the present invention.

BEST MODE FOR CARRYING OUT THE INVENTION

Figure 1:
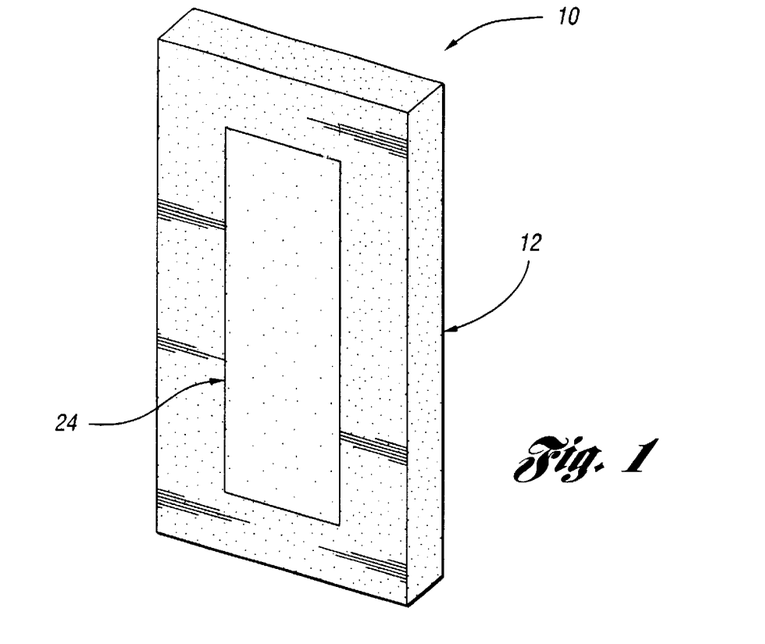
FIG. 1 is a perspective diagram of an automated tape library rotary access port in an closed position as seen from an external view relative to the tape library machine.
Figure 2:
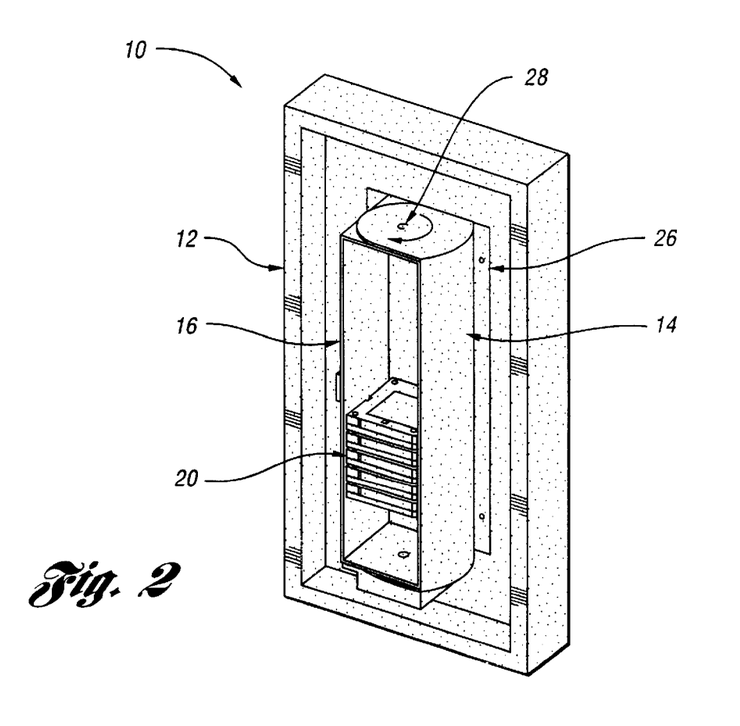
FIG. 2 is a perspective diagram of an automated tape library rotary access port in a closed position as seen from an internal view looking outwardly from within the tape library machine.
Figure 3:
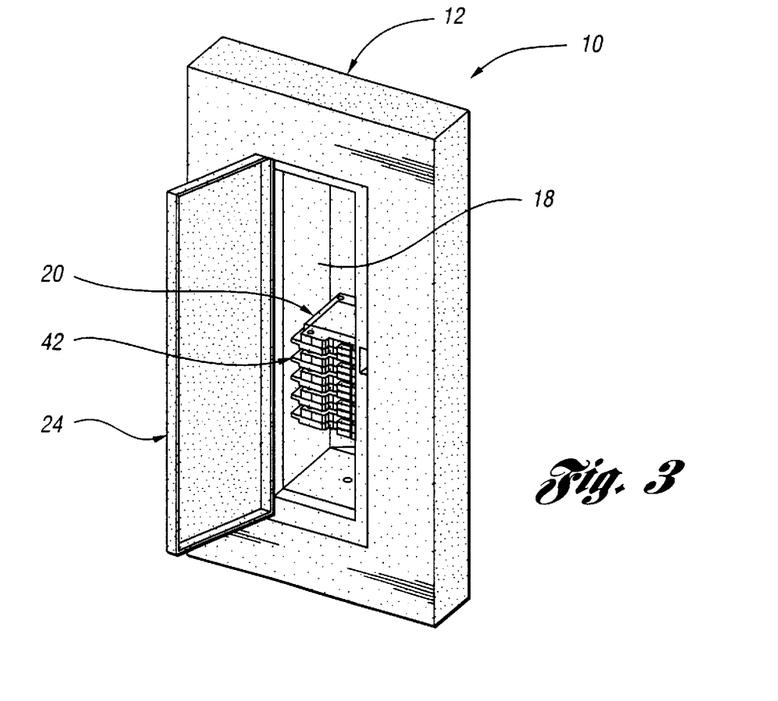
FIG. 3 is a perspective diagram of an automated tape library rotary access port in an open position as seen from an external view relative to the tape library machine.
Figure 4:
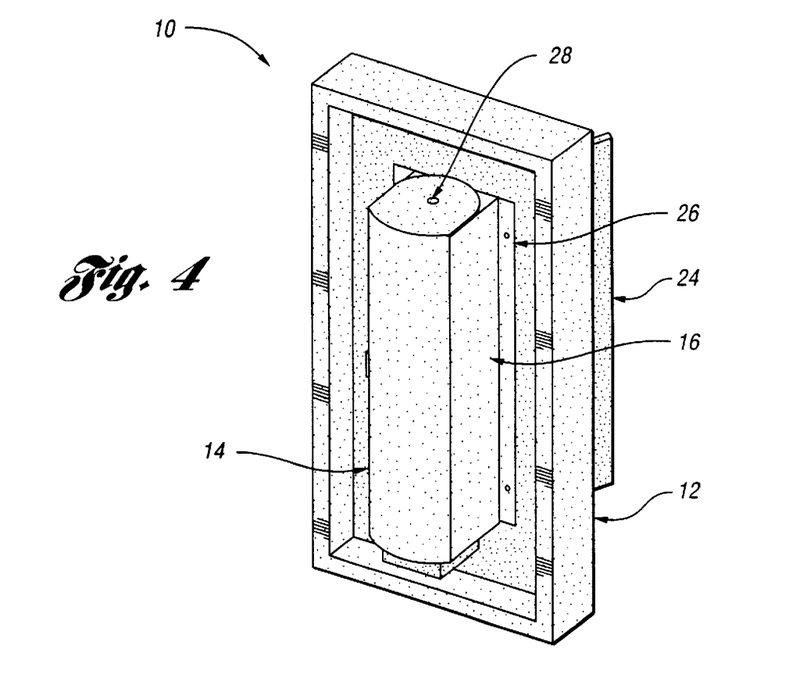
FIG. 4 is a perspective diagram of an automated tape library rotary access port in an open position as seen from an internal view looking outwardly from within the tape library machine.

Referring now to FIGS. 1–4, a double-door safety access port 10 for an automated tape library machine 12 is shown in accordance with the present invention. More specifically, the access port includes an inner door 14 rotatably mounted to a stationary frame 16 forming a cavity 18 therein. A front and bottom view showing inner door 14 in isolation are provided in FIGS. 5 and 6 respectively. Cavity 18 allows tape cartridges to be inserted and removed from a stationary tape retention arrangement 20 integrated or mounted to the cavity side of frame 16. In a preferred embodiment, inner door 14 is formed in a semi-cylindrical shape. As best seen in FIGS. 1 and 4, frame 16 is dimensioned large enough that cavity 18 nests within a corresponding access opening provided in a portion of the housing of library tape machine 12. When inner door 14 is in a closed position as shown in FIG. 4, the inner door seals off the inside of the tape machine from cavity 18 and the access opening so as to provide a barrier between an operator and the inside of the library machine. Library machine 12 can be of any conventional design, and includes an automated tape retrieval robot mechanism located therein for moving loaded tape cartridges between a tape drive system and the stationary tape retainer mechanism.

In further accordance with the present invention, an outer door 24 is mounted to the housing of library machine 12 using a suitable hinge arrangement (not shown) so as to allow outer door 24 to be moved by an operator back and forth between an open position as shown in FIG. 3 and a closed position as shown in FIG. 1 to control external access to cavity 18. Outer door 24 and inner door 14 are inter-latched together as described below so as to insure that a physical barrier is present at all times between an operator and the inner robotic mechanisms of library machine 12.

Frame 16 can be mounted to an inside portion of the library machine housing via a suitable flange member 26. A shaft and journal mechanism 28 couples inner door 14 to the stationary flange to allow the inner door to rotate into the closed position shown in FIG. 4, or an open position such as shown in FIG. 2.

Figures 5, 6:
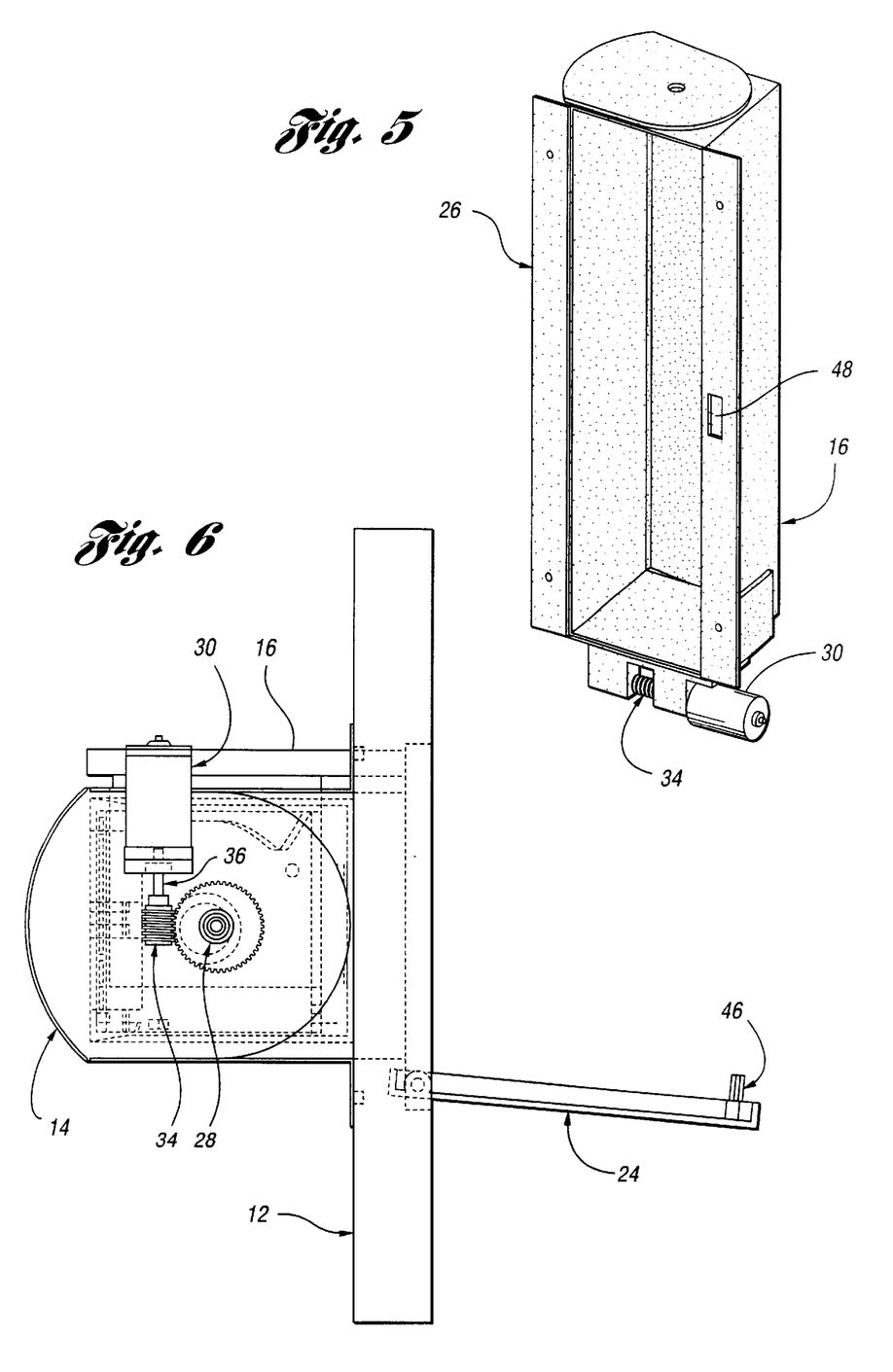
FIG. 5 is a perspective diagram of the inner door of the present invention.
FIG. 6 is a diagram of one end of the inner door of the present invention showing the motor and self-latching drive gear arrangement.

Referring now to FIG. 6, an electric motor 30 and drive gear arrangement 32 are mounted to one end of frame 16. In the embodiment shown, the motor and drive gear arrangement are mounted to the bottom of frame 16, however this is not to be construed as limiting. In accordance with the present invention, drive gear arrangement 32 is arranged to lock in response to a torque being exerted at the drive gear thereof. With such an arrangement, only the motor can rotate the inner door. In other words, the gear arrangement will not allow manual rotation of inner door 14. In a preferred embodiment, the drive gear arrangement includes a worm gear 34 attached to a motor shaft 36, an intermediate gear 38 engaged by the worm gear, and a drive gear 40 attached to shaft and journal mechanism 28 and positioned to be engaged by the intermediate gear. In operation, motor 30 is energized to rotate motor shaft 36 and worm gear 34, which in turn rotates intermediate gear 38 and drive gear 40 to rotate inner door 14 into the open or closed position. Any suitable shaft locking arrangement can be used to cause motor shaft 36 to lock in response to an externally applied torque being applied thereto via the drive and intermediate gears. For example, one or more suitably contoured pins and a cam surface can be positioned about motor shaft 36 such that the pins will wedge between the cam surface and shaft whenever a torque is externally applied to the worm gear end of the shaft,. However, such an example is not limiting as other suitable shaft locking arrangements could be alternatively employed. Operation of motor 30 can be controlled from a control panel switch (not shown) mounted on the outside of the library housing near opening 22, and/or from any other suitable remote operator interface.

Stationary tape retention arrangement 20 includes at least one slot or cell 42 arranged to retain a tape in position until accessed by the robotic tape mechanism (not shown) located within library machine 12. As shown, tape retention arrangement 20 preferably forms a vertical stack of cells 42 allowing insertion of multiple tape cartridge volumes into the library machine at the same time.

In operation, when a user wishes to gain access to the tape retainer and cavity 18, motor 30 is controlled to rotate the inner door 14 into the closed position of FIG. 4 which in turn unlatches outer door 24 allowing it to be opened as shown in FIG. 3. When the outer door is in the open position, an operator will have direct access to the tape retention arrangement to allow insertion or removal of tape cartridges. Because the tape retainer does not move, tape cartridges are inserted with a label end facing toward the robot side of the access port. Once the desired tape cartridges have been inserted, the operator can close the outer door into a latched position as shown in FIG. 1. Once the outer door is properly latched, the motor is controlled to rotate the inner door into the open position of FIG. 2. Once in the open position, the library machine robot will have direct access to the loaded tape cartridges. During access port operation, the inter-latching of the inner and outer doors insure that at no time can an operator reach into the library machine, thereby preventing potential injury resulting from contact with the robot mechanism located therein.

An inter-latching arrangement in accordance with one embodiment of the present invention is shown in detail in FIGS. 7(a)–(d). More specifically, as noted above, the worm drive gearing of the present invention prevents inner door 14 from rotating unless driven by the motor. Outer door 24 includes a catch formed from a lever 46 mounted to the inside surface of the outer door which extends through an opening in the library housing (not shown) and an opening 48 in flange 26 when the outer door is closed. The lever includes a notch or pocket 50 formed at the end of the lever arm thereof for receiving a finger tab 52 located on a rotatable latch 54 mounted to stationary frame 16. Latch 54 is spring biased in a counter-clockwise direction as shown in FIGS. 7(a)–(d) so as to naturally rotate finger tab 52 out of engagement with lever pocket 50 when released from the latched position of FIG. 7(a). The arrows shown in these figures denote a direction of spring biasing for an associated element. Latch 54 includes a cam surface 58 which mates with a corresponding cam surface 60 on a pivotally mounted latch lock 62.

A spring loaded, rotatable latch trigger 64 is mounted to a top surface of inner door 14 and operates in conjunction with a stationary peg 66 also mounted to the upper surface to make contact with a protrusion 68 extending upwardly from a rotatable latch pull 70 mounted to stationary frame 16. Latch pull 70 is connected to latch lock 62 via a cable 72.

Figure 7A:
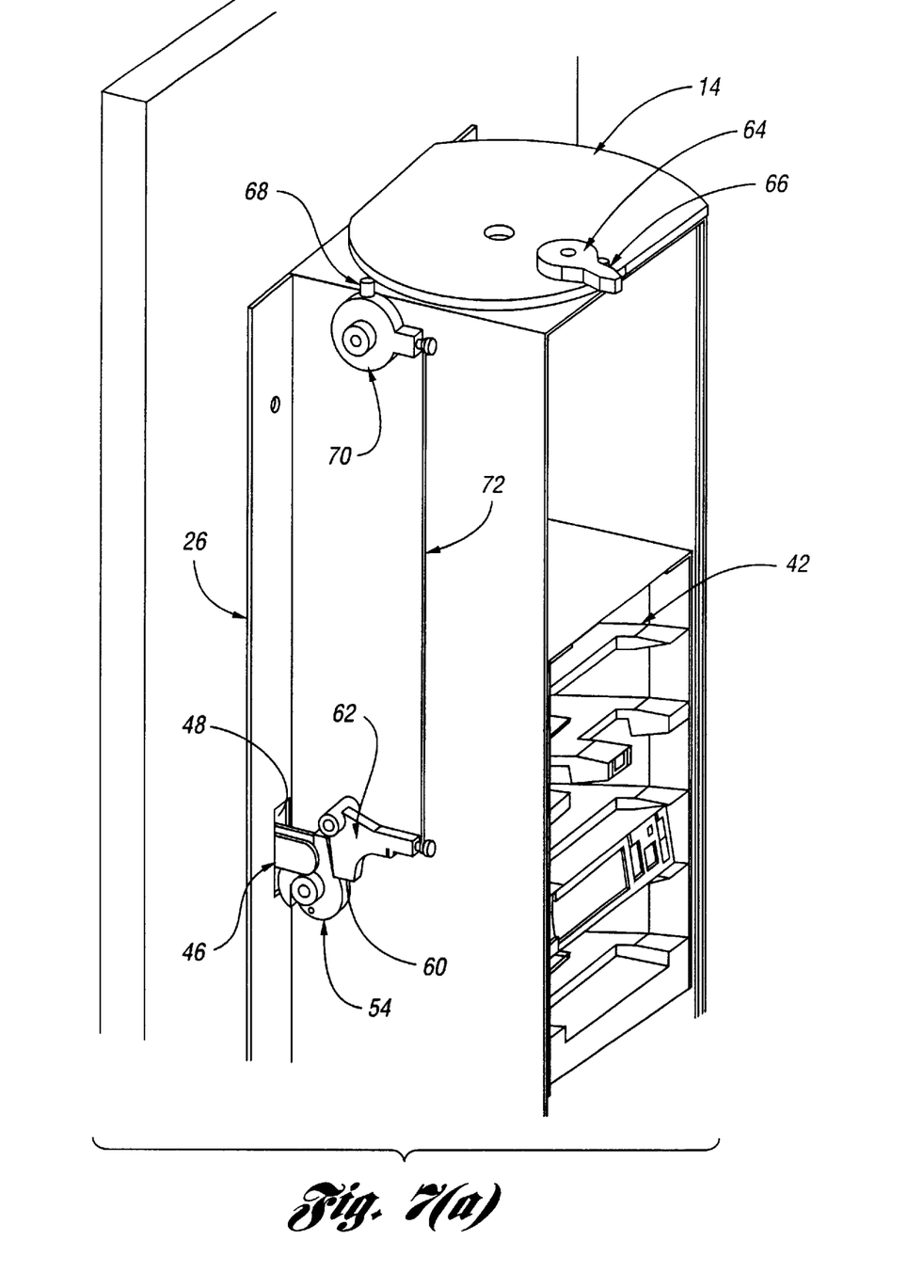
Figure 7B:
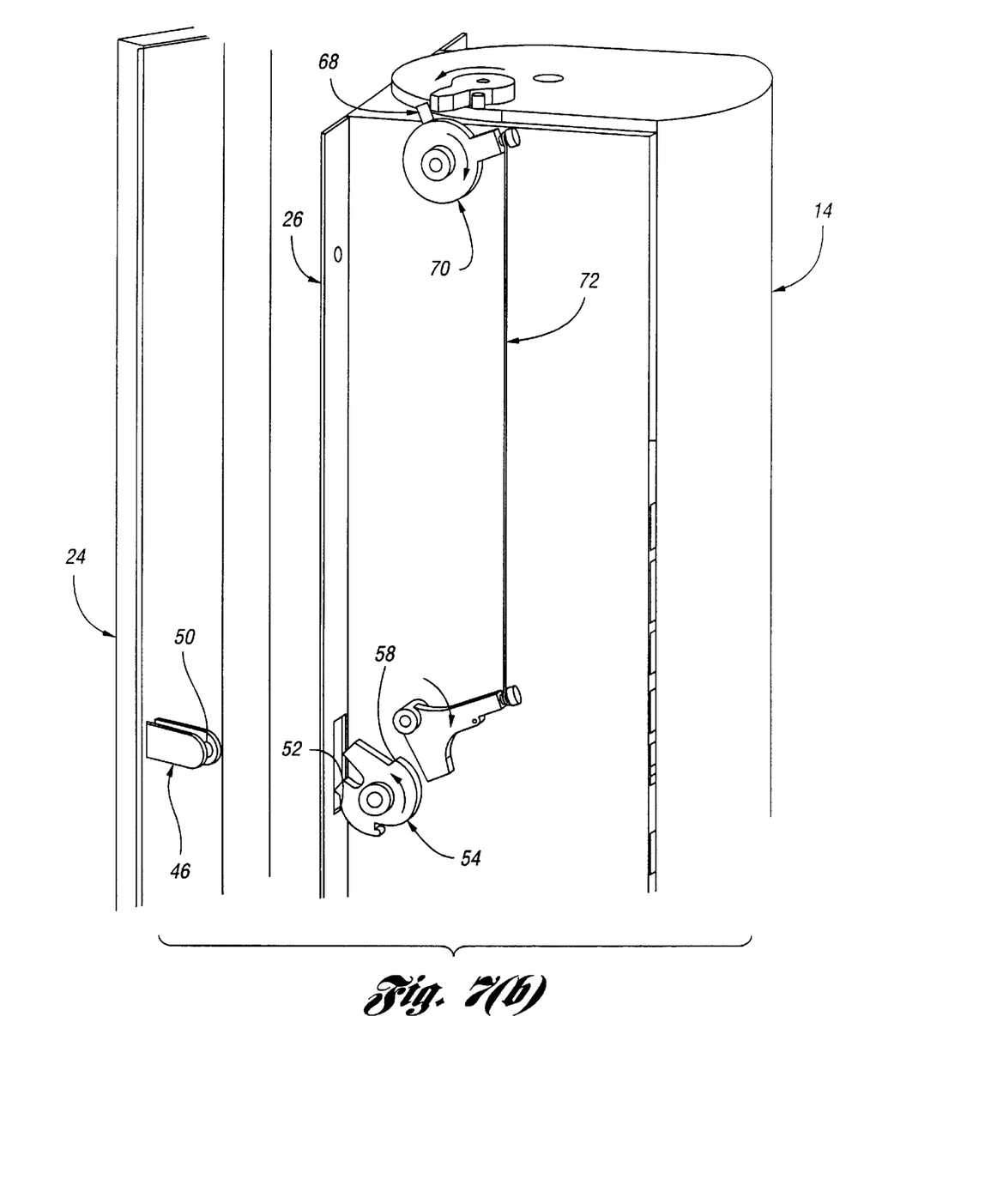
Figure 7C:
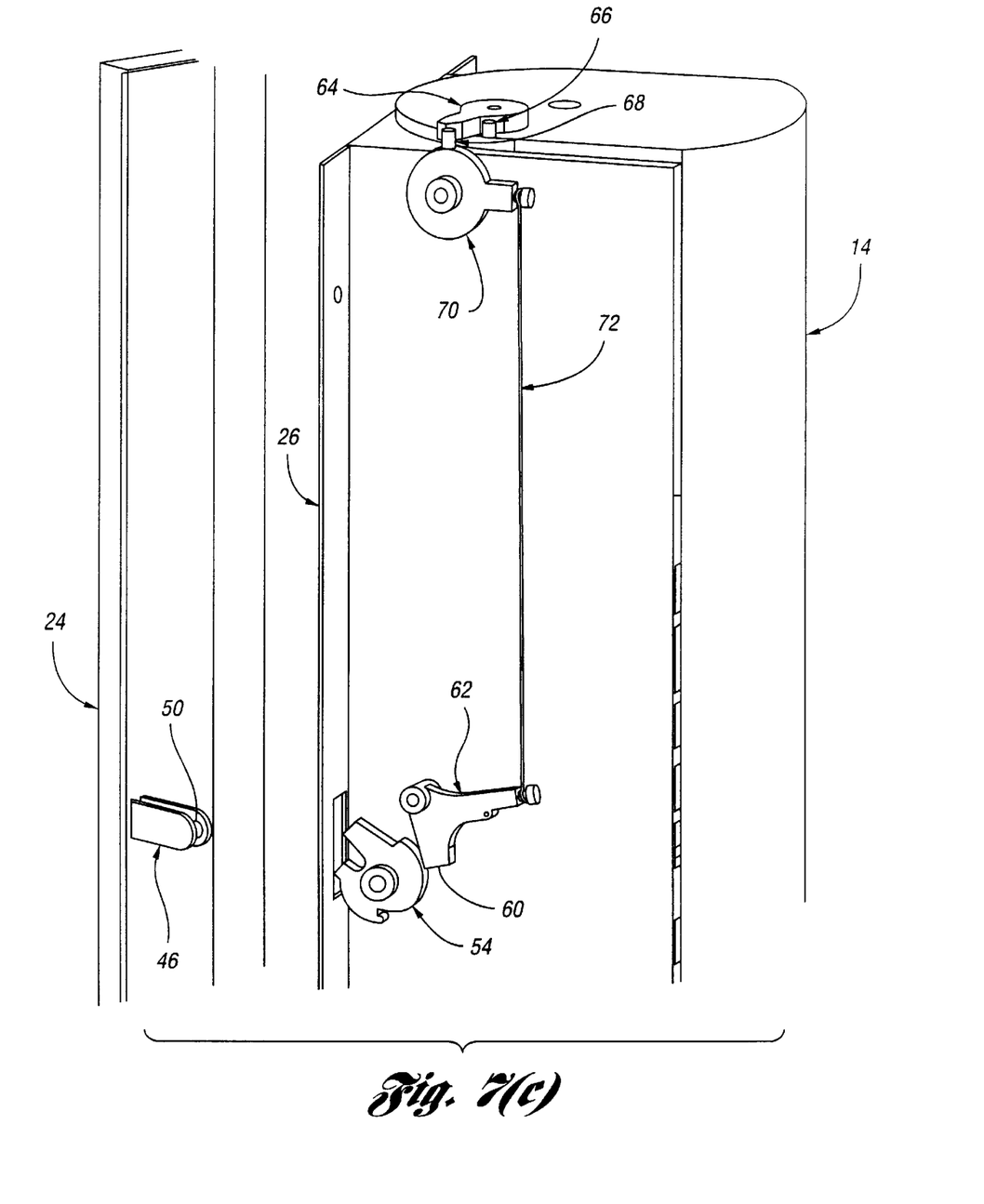

In operation, when inner door 14 is in the open position of FIG. 7(*a*), the cooperating cams allow latch lock 62 to prevent latch 54 from disengaging from lever 46, thereby maintaining the outer door in a latched condition. As the inner door closes as shown in FIG. 7(*b*), latch trigger 64 is swung into contact with protrusion 68. Stationary peg 66 prevents latch trigger 64 from rotating, which in turn causes latch pull 70 to be rotated in a counter-clockwise direction as the inner door reaches a completely closed position. As latch pull 70 rotates, cable 72 will rotate latch lock 62 in a counter-clockwise direction thereby allowing the spring bias on latch 54 to rotate the latch out of engagement with lever 46 as shown in FIG. 7(*c*). Once disengaged, outer door can then be opened by an operator to gain access to the access port cavity and tape retention mechanism. Subsequent closing of outer door 24 causes lever 46 to contact latch 54 and rotate the finger tab 52 back into engagement with pocket 50. As latch 54 rotates in the counter-clockwise direction into engagement with pocket 50, the recessed cam surface 58 allows the spring biasing of latch lock 62 to rotate its cam surface 60 into engagement with cam surface 58 to again lock latch 54 from rotating out of engagement with lever 46 as shown in FIG. 7(*d*).

An alternative inter-latching arrangement can be provided using a solenoid actuated latch which locks the outer door into the closed position. Operation of the solenoid could be controlled by a switch mounted to the inner door which is arranged to automatically respond to movement of the inner door. Once the inner door is completely closed, the solenoid would be deactivated to allow an associated outer door latch to be moved by the operator into an unlatched position.

Thus, the combined effect of the double-door arrangement ensures that the access port of the present invention is safe during all modes of operation, which in turn obviates the need to take the library machine off-line simply to load and unload tape cartridges. In addition, reliability of access by the machine robot is improved because the loaded cartridges remain stationary within the access port shell until engaged by the library robot. Such a stationary arrangement significantly simplifies both the library hardware and operation of the robot mechanism while also improving tape handling/alignment reliability.

While the best mode for carrying out the invention has been described in detail, those familiar with the art to which this invention relates will recognize various alternative designs and embodiments for practicing the invention as defined by the following claims.

What is claimed is:

1. An access port mounted to an automated library housing for allowing insertion and removal of storage media cartridges from the library, said access port comprising:

a cartridge access opening formed in the library housing;

an inner door mounted adjacent the access opening on the inside of library housing;

a motor coupled to the inner door to control movement of the inner door between an open position and a closed position, the motor arranged to lock in response to an external force being applied thereto to prevent movement of the inner door unless driven by the motor, an outer door mounted adjacent the access opening on the outside of the library housing; and a latch arrangement mounted to the inner and outer doors which only unlatches the outer door when the inner door is in the closed position.

2. The access port of claim 1 further comprising a stationary cartridge retainer mechanism positioned within the access opening between the inner and outer doors.

3. The access port of claim 2 wherein the stationary cartridge retainer mechanism comprises a vertical stack of cells each configured to retain a cartridge in a position for access by a robotic mechanism within the tape library.

4. The access port of claim 3 wherein the cells are arranged to receive a tape cartridge with a label side facing toward the inside of the tape library.

5. The access port of claim 2 wherein the inner door is rotatable, and the motor is arranged to control rotation between an open position to allow a robotic mechanism within the library housing access to the stationary cartridge retainer mechanism, and a closed position to provide a barrier between the access opening and the inside of the library housing.

6. The access port of claim 1 wherein the latch arrangement comprises a latch pull connected to a latch lock mounted to the inner door, said latch pull arranged to pull the latch out of engagement with a latch mount to an inner surface of the outer door when the inner door is in the closed position.

7. The access port of claim 6 wherein the latch arrangement further comprises a latch trigger mounted to the inner door and positioned to engage the latch pull as the inner door move s into the closed position.

8. A method for controlling access to a cartridge retainer mechanism positioned within an access opening in an automated cartridge library housing for allowing insertion and removal of cartridges from the library, the library including an inner door mounted adjacent the access opening on the inside of library housing, and an outer door mounted adjacent the access opening on the outside of the library housing, said method comprising:

selectively operating a motorized drive to move the inner door to either an open position which allows a robotic mechanism within the library housing access to the cartridge retainer mechanism, or a closed position which provides a barrier between the access opening and the inside of the library housing;

preventing movement of the inner door by locking the motorized drive in response to an external force applied thereto;

latching the outer door in a closed position when the inner door is not in a closed position to prevent the outer door from being moved into an open position; and unlatching the outer door only when the inner door is in the closed position.

\* \* \* \* \*